United States Patent [19]

Dahlqvist

[11] Patent Number: 4,574,376
[45] Date of Patent: Mar. 4, 1986

[54] ACTIVATION OF A TRANSMISSION LINK BY CODE SENDING

[75] Inventor: Ingemar E. Dahlqvist, Johanneshov, Sweden

[73] Assignee: Telefonaktiebolaget L M Ericsson, Stockholm, Sweden

[21] Appl. No.: 626,866
[22] PCT Filed: Dec. 14, 1983
[86] PCT No.: PCT/SE83/00451
§ 371 Date: Jun. 29, 1984
§ 102(e) Date: Jun. 29, 1984
[87] PCT Pub. No.: WO84/02816
PCT Pub. Date: Jul. 19, 1984

[30] Foreign Application Priority Data

Dec. 30, 1982 [SE] Sweden ............... 8207517

[51] Int. Cl.⁴ ............... H04J 3/06; H04L 7/00
[52] U.S. Cl. ............... 370/103; 375/107; 340/825.52
[58] Field of Search ............... 370/100, 103, 110.1; 375/107; 179/99 M, 2 DP; 178/3; 340/825.52, 825.14

[56] References Cited

U.S. PATENT DOCUMENTS 3,823,387 7/1974 McClellan ............... 340/825.52
4,143,246 3/1979 Smith ............... 370/100
4,314,109 2/1982 Sekiguchi et al. ............... 370/103
4,355,386 10/1982 Binz et al. ............... 370/100

Primary Examiner—Douglas W. Olms
Assistant Examiner—Frank M. Scutch, III
Attorney, Agent, or Firm—Roberts, Spiecens & Cohen

[57] ABSTRACT

A method and apparatus in a telecommunication system for activating from idling state to active state. This system includes a digital transmission link consisting of a subscriber side containing a subscriber terminal (NT) and a station side containing a line terminal (LT) assigned to the station, the line terminal being connected to a clock pulse oscillator (CLM) constituting the master clock for the system, and the network terminal being connected to a local clock pulse oscillator (CLS) constituting a slave clock. Activation may take place either from the subscriber side or from the station side. In activation from the subscriber side an activation request signal (AR) is sent from a subscriber to the network terminal (NT) from which a cyclic bit pattern is sent to the line terminal (LT). The bit pattern is detected and sent as an activation request to the station which sends an activation order (AO) back to the line terminal. The line terminal sends frame formatted data and synchronizing signals back to the network terminal which then sends activation order to the subscriber and acknowledgement signals to the station. In activation from the station side, the activation order goes directly from the station without a preceding activation request from the subscriber.

2 Claims, 1 Drawing Figure

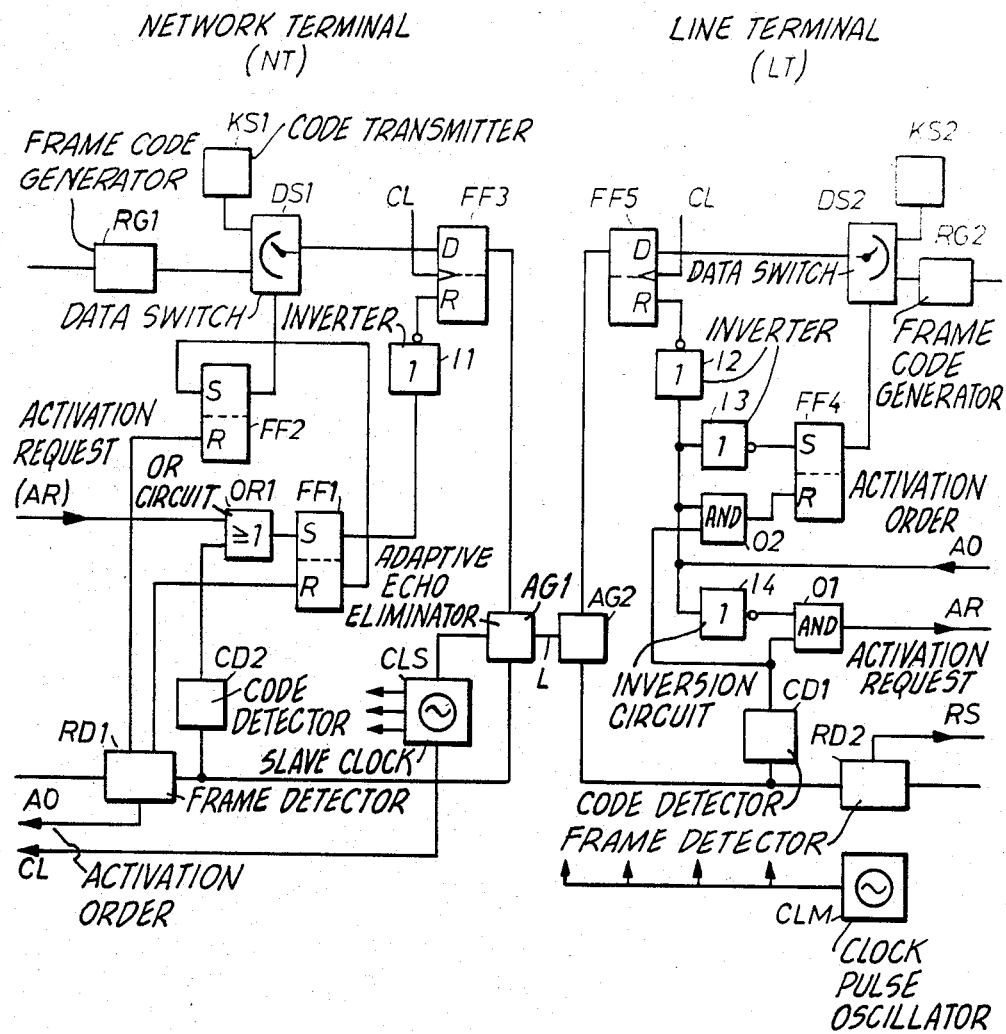

ACTIVATION OF A TRANSMISSION LINK BY CODE SENDING

TECHNICAL FIELD

The invention relates to an apparatus in a telecommunication system for activating subscriber terminals in a digital subscriber connection e.g. including a line terminal, a network terminal and one or more subscriber terminals.

BACKGROUND ART

It is known to switch subscribers from idling state to activated state with the aid of special activation signals in the form of DC signals.

DISCLOSURE OF INVENTION

A problem occuring in DC activation is the requirement of detecting different DC current levels in order to distinguish between idle condition currents and activation currents. Since the idle condition currents are used to maintain certain functions in the terminal during the idling state also, the idle condition current level is also limited by the level of the activation signal, there being limits to how low the former may fall and how high the latter may rise. This rerults in a small margin between the different voltage levels and thus increases the sensitivity to noice.

The apparatus in accordance with the invention is characterized by the claim, and solves the problem by the activation being carried out with the aid of binary codes in the form of continuously-sent bit patterns. Detection of the codes is carried out digitally.

The apparatus in accordance with the invention is mainly applied in activating a digital transmission link in which one terminal contains a stable clock pulse oscillator functioning as a master clock, and the other terminal contains a slave clock which is plesiochronous in relation to the master clock.

In the described apparatus, acitivation is performed between a network terminal NT assigned to the subscriber installation and a line terminal LT assigned to the station equipment. The line terminal LT contains a stable master clock and the network terminal LT contains a slave clock working plesiochronously in relation to the master clock. Activation can be initiated either from the subscriber side of a connection or from the station side.

In activation from the subscriber side an activation request from a subscriber starts a transmitter in the network terminal NT. A code (continuous bit pattern) is sent with plesiochronous bit rate from the subscriber side (terminal NT) to the station side (terminal LT). The code is detected in the line terminal LT of the station side and is interpreted as an activation request. The station accepts the activation request by triggering an activation order. The activation order starts a transmitter in the line terminal LT and connects it for transmission of data in frame format back again to the network terminal NT under control of the master clock. The local slave clock on the subscriber side is synchronized to the rate of the master oscillator taken from the bit flow received from the line terminal LT. When the frame format is detected, the network terminal transmitter is switched over for sending out data in frame format back again to the station side. On the station side, the frame format-frame synchronization is detected and there is thus indicated that the link between subscriber side and station side is bit- and frame-synchronous, the activation thereby being completed.

When activation is initiated from the station side, no activation request is sent and an activation order is released directly. This is because an activation order is always triggered from the station/master side. The activation order starts the line terminal transmitter, which then sends a code in the form of a continuous bit flow to the network terminal NT. The local clock on the subscriber side is synchronized to the rate in the received bit flow, the code is detected and the transmitter on the subscriber side (the terminal NT) is started. A code is sent from the subscriber to the station. The code is detected on the station side and the line terminal transmitter is switched over to transmission of the data in frame format back again to the subscriber network terminal. The frame format-frame synchronism is detected in the network terminal and its transmitter is switched over to transmit data in frame format to the station side. The frame format-frame synchronism is finally detected in the line terminal LT of the station side, it thus being indicated that the link is bit- and frame-synchronous. The activation and synchronizing process is thereby terminated.

Deactivation is always initiated from the station and takes place by the activation order being taken away. When this happens the station transmitter is stopped and switched to the code transmission state. A time measurement is started when the frame synchronism can not be detected on the subscriber side. The subscriber's transmitter is stopped after a given time without frame synchronism and is switched over to code transmission, i.e. both terminals LT and NT assume the idling state.

The application of the apparatus in accordance with the invention may be in an integrated services digital network (ISDN) and is particularly suitable when the line sides of the terminals are equipped with adaptive echo elimniators (adaptive hybrid circuits), since existing transmitters and receivers can then be used in the activation process, i.e. the transmitters and receivers which are normally used for transmission. By utilizing a continuous transmission method, very little extra hardware is required for providing continuous code transmission in accordance with the invention.

DESCRIPTION OF FIGURES

An apparatus in accordance with the invention is described in detail with the aid of an embodiment and with reference to the accompanying drawing, which is a block diagram of a system in which the apparatus in accordance with the invention is incorporated.

PREFERRED EMBODIMENT

The circuitry for the apparatus in accordance with the invention is illustrated in the form of a block diagram in the FIGURE, for both the subscriber side network terminal NT and the station side line terminal LT. In activation from the subscriber side there is obtained in the network terminal NT, as will be seen from the FIGURE, a signal corresponding to the activation request AR from a subscriber to a first input on a type 4001 OR circuit OR1. The OR circuit OR1, a flip-flop FF1, a flipflop FF2 and an inverter I1 together comprise a first send control means S1. The output from the circuit OR1 activates the setting input of the type 4013 flipflop FF1, the output signal of which acutates via the type 4049 inverter I1 the reset input of a type 4013 flipflop FF3, thus enabling signal transmission. A code transmitter KS1, e.g. consisting of one or more feedback connected type 4013 D flipflops, then sends an activation request in the form of a continuous cyclic bit pattern through a type 4053 data switch DS1, through the flipflop FF3, further through an adaptive echo eliminator AG1 and out on the line towards the line terminal LT. The data switch DS1 can assume two states; a first state in which the continuous bit pattern from the code transmitter KS1 is through connected, and a second state in which data information in frame format corresponding to normal transmission is through connected via a frame code generator RG1. The data switch obtains its control signal in the form of a synchronizing signal from a frame detector RD1 and a flipflop FF1 via the type 4013 flipflop FF2.

The line terminal LT receives the information from the subscriber side via an adaptive hybrid circuit AG2.

The code is detected in a code detector CD1 containing a type 4015 shift register and decoding gate logic connected to a type 4516 counter, is acknowledged as an activation request AR, and is sent as such towards the station via an AND circuit O1, the station then triggering an activation order AO, e.g. a logical one signal. The activation order signal activates a first input on an AND circuit O2, The second input of which is activated when the activation request e.g. in the form of a logical one signal, is available on the output of the code detector CD1. Together with an inverter I2, an inverter I3 and a flipflop FF4, the circuit O2 comprises a second send control means S2. The output signal from the AND circuit activates the resetting input on a flipflop FF4, the output signal of which resets a second two-way data switch DS2, of the same type as the switch DS1. Data information in frame format including frame synchronizing signal is then sent from a frame code generator RG2, through the data switch, through a flipflop FF5, through an adaptive echo eliminator (adaptive hybrid) AG2 and to the subscriber side via the line L. The flipflop FF5 is controlled by the activation order signal through the inverter I2, the output signal from the inverter being supplied to the resetting input of the flip-flop so that a logical zero signal to the input results in that the flipflop passes through the information from the switch DS2. When no activation order signal exists, the flipflop FF5 is blocked by a logical one signal on the reset input.

The setting input of the flipflop FF4 is furthermore activated through an inversion circuit I3, the output signal of the flipflop now controlling the data switch DS2 such that the latter is set to its second state thus enabling through connection of signals from the code transmitter KS2. In this state, the idling state of the code transmitter, the latter sends a continuous, cyclic bit pattern which is not yet fed out on the line (the flipflop FF5 is blocked). An inversion circuit I4 interrupts the activation request to the station when an activation order is sent.

The information in frame format from the station side is received on the subscriber side through the adaptive hybrid AG1, slave clock CLS being conventionally synchronized with the station clock rate by clock pulse recovery from the incoming bit flow. A frame detector RD1 detects the synchronizing information in the received data flow and sends a control pulse to the resetting input of a flipflop FF2, the output signal of which then switch the data switch DS1 to the state for sending information in frame format from a frame code generator RG1. A further control signal from the frame detector has the task of resetting the logic circuits to their idling state when disconnecting the line. Activation order signals AO to the connected subscriber terminals are also sent from the frame detector RD1 of the network terminal NT. Clock pulse signals are sent from the clock CLS to connected subscriber terminals. The information in frame format from the generator RG1 is sent via the hybrids AG1 and AG2 to a frame detector RD2 in the line terminal LT, this detector in turn passing acknowledged information and synchronizing signal RS to an unillustrated station at a higher level, e.g. a central processor CPU. The processor is not described any further, since it is not a subject of the inventive concept. The activation process between subscriber (network terminal NT) and the station (line terminal LT) is thereby completed. In activation from the station side, no activation request is processed, and the activation order goes directly to the activation logic of the line terminal. In this state the flipflop FF5 is activated and enables sending a continuous, cyclic bit flow from the code transmitter KS2 under control of the central clock pulse oscillator CLM, via the line L to a code detector CD2 in the network terminal NT. The code detector, comprising decoding gate logic, a 4015 shift register and a 4516 counter connected thereto, detects the code in the received bit flow and sends an activation signal to a second input on the OR circuit OR1 in the activation logic of the network terminal. The local clock pulse oscillator CLS is simultaneously synchronized to the station clock rate by clock pulse recovery from the received bit flow. When the OR circuit OR1 is activated there is sent, in a manner previously described, a continuous, cyclic bit flow in series form from the code transmitter KS1 in the network terminal to the code detector CD1 in the line terminal, thus releasing transmission of data in frame format and synchronizing signals from the line terminal to the network terminal as previously described, whereon sending of data in frame format is released from the network terminal to the line terminal in a manner described previously.

After frame format-frame synchronism has been detected on the station side, the activation process between station (line terminal) and subscriber (network terminal) is completed.

I claim:

1. A method in a telecommunication system for activating means from idling state to active state, there being included in the system a digital transmission link consisting of a subscriber side including a network terminal (NT) assigned to the subscriber, and a station side including a line terminal (LT) assigned to the station, said line terminal being connected to a clock pulse oscillator constituting the master clock for the system, and said network terminal being connected to a local clock pulse oscillator constituting a slave clock characterized in that;

for activation initiated by a subscriber said network terminal (NT) is adapted for receiving an activation request from a connected subscriber, and that said terminal (NT) on reception of the activation request is caused to send a code corresponding to the request in the form of a binary, continuous and cyclic bit pattern with plesiochronous clock pulse rate to the line terminal (LT) through the line (L), and that said line terminal is adapted for detecting said activation request and in response thereto is to send back to the subscriber side an activation order signal in the form of binary data in frame format including synchronizing information, and that on reception of said frame format the network terminal (NT) interprets this as an activation order, and is adapted for synchronizing its own clock pulse rate with the master clock information in the incoming bit flow, and that for received frame synchronizing information the network terminal is caused to send an activation order to the subscriber and to send data in frame format including frame synchronizing information back again to the station side, and that the line terminal is adapted to detect said data in frame format and in response to the result send acknowledgement signals to the station, and that for station-initiated activation, the line terminal (LT) is adapted for directly sending an activation order in the form of a continuously transmitted cyclic bit pattern which, on detection in the network terminal (NT), is arranged to trigger sending a corresponding continuous cyclic bit pattern from the network terminal to the line terminal, and that the pattern is disposed for detection in the line terminal, which is adapted for transmitting data in frame format including synchronizing information back to the subscriber side, and that the network terminal, on detection of frame synchronism, is caused to send an activation order to the subscriber and to send data in frame format including frame synchronism to the line terminal, and that the line terminal (LT) is adapted to detect said data in frame format and in response to the result is caused to send acknowledgement signals to the station.

2. Apparatus in a telecommunication system for activating means from an idling state to active state, there being included in the system a digital transmission link consisting of a subscriber side including a network terminal (NT) assigned to the subscriber, and a station side including a line terminal (LT) assigned to the station, said line terminal being connected to a clock pulse oscillator constituting the master clock for the system, and said network terminal being connected to a local clock pulse oscillator constituting a slave clock, characterized in that;

in activation from the network terminal (NT) a first send control means (S1), on reception of an activation request signal (AR) from a subscriber, activates a code transmitter (KS1) for sending said activation request in the form of a continuously sent, cyclic bit pattern through a first data switch (DS1), a first through connection circuit (FF3), a first adaptive hybrid circuit (AG1) and a transmission line (L) to a line terminal (LT) including a second adaptive hybrid circuit (AG2); a first code receiver (CD1) for detecting said activation request (AR) and for sending it towards a station (CPU), said station sending an activation order signal (AO) in response to said activation request; a second send control means (S2) for receiving said activation order and for activating a second data switch (DS2) for through connection of data in frame format and synchronizing information sent from a frame code generator (RG2) under the control of a central clock pulse oscillator (CLM) back to the network terminal (NT), in which said local clock pulse oscillator (CLS) is synchronized to the rate from the master clock (CLM) from the received data flow;

and that on detection of frame format and frame synchronism a first frame detector (RD1) sends an activation order (AO) to the subscriber and control signals to said first send control means (S1), the output signal of which activates said first data switch (DS1) to change position, and for through connection of data in frame format from a further frame code generator (RG1) back to the line terminal (LT), in which a second frame detector (RD2) detects the received information and for discovered frame format and frame synchronism sends acknowledgement signals RS) to the station; and in station-initiated activation an activation order (AO) is sent from the station to said second send control means (S2), the output signal of which activates a second through connection circuit (FF5) for through connection and sending of a continuous signal containing a cyclically repeated bit pattern from a second code transmitter (KS2) back to the network terminal (NT), in which a second code detector (CD2) sends a control signal, after detection of said bit pattern, to said first send control means (S1), the output signal of which activates said first through connection circuit (FF3) for through connection of a continuously sent cyclic bit pattern from said first code transmitter (KS1) to the line terminal (LT), in which said first code receiver (CD1) sends a control signal, after detection of the received signal, to said second send control means (S2), the output signal of which activates said second data switch (DS2) such as to assume its state for through connection of frame-formatted data and synchronizing information sent from said frame code generator (RG2) back to said network terminal (NT); the local clock pulse oscillator (CLS) in the network terminal being synchronized with the rate from the master clock (CLM) from the received data flow, and after detecting frame format and synchronizing information said first frame detector (RD1) sends an activation order (AO) to the subscriber, and activates said first send control means (S1), the output signal of which activates said first data switch (DS1) for changing state and for through connection of frame-formatted data sent from said further frame code generator (RG1) back to the line terminal (LT), in which said second frame detector (RD2) detects the received information and sends said acknowledgement signals (RS) to the station for discovered frame format and frame synchronism.

* * * * *